Sept. 14, 1954 E. MARX 2,688,747
PLASTIC HELMET
Filed May 26, 1952 2 Sheets-Sheet 1
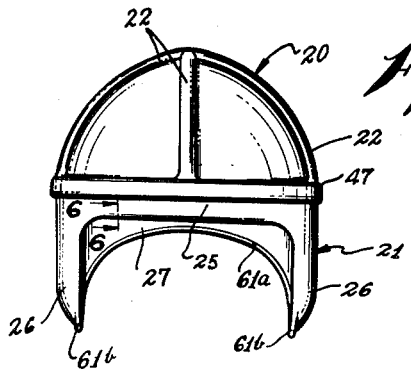
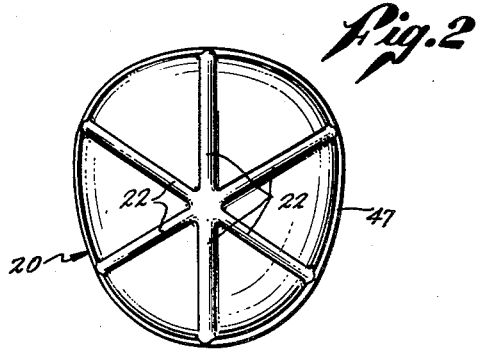
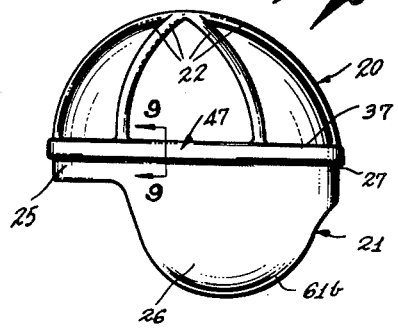
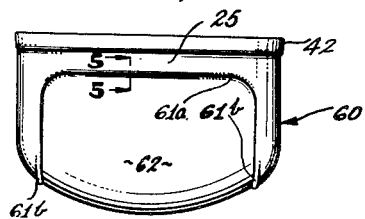
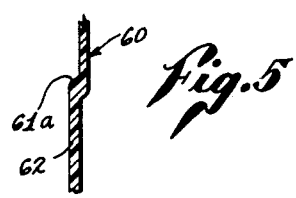
INVENTOR.
ERICH MARX
BY
Attorney Sept. 14, 1954  E. MARX  2,688,747
PLASTIC HELMET
Filed May 26, 1952  2 Sheets-Sheet 2

INVENTOR.
ERICH MARX
BY Forrest J. Lilly
Attorney

Patented Sept. 14, 1954

2,688,747

UNITED STATES PATENT OFFICE 2,688,747

PLASTIC HELMET

Erich Marx, West Los Angeles, Calif., assignor to B. E. McDonald Company, Los Angeles, Calif., a corporation of California Application May 26, 1952, Serial No. 290,010

4 Claims. (Cl. 2—6)

This invention relates to protective plastic or reinforced plastic helmets of the type used in aviation, sports and industry to protect the wearer's head against the hazards of dangerous impacts.

While the invention is broadly applicable to the construction of protective head gear of this general type for various specific purposes, it has special utility for meeting the particular problem of fabricating a plastic crash helmet for use in sports, by aircraft pilots, automobile racers, motorcycle police and the like. Such a practice of the invention will be described herein by way of disclosure and illustration, and to provide adequate guidance for those skilled in the art who may have occasion to apply the same principles to other specific purposes.

The fabrication of a plastic or reinforced plastic crash helmet by any molding, casting or lamination procedure is a problem, for one reason, because such a helmet has a continuous depending skirt with downwardly extending portions to protect the ears of the wearer. Parts of this skirt are re-entrant and overhang the cavity of the crown portion to interfere with the withdrawal of any male mold or die means that might be utilized for the forming operation. Such interference may be avoided by using complicated multiple-part forming members, break away forms, or by using collapsible pressure bags, but for economical production and especially for mass production of crash helmets, simple forming or molding operations with the use of simple unitary forming members is to be preferred. One object of the invention is to make possible economical production in this manner.

A further fabrication problem arises from the desirability of having the skirt of the helmet, particularly the ear protecting portions, of yielding character or flexible or thinner to a desirable degree, whereas in contrast the crown portion itself should be relatively rigid or stiff, or of greater wall thickness. A second object of the invention is to meet this further requirement.

A still further consideration in the fabrication of a protective helmet is the requirement for reinforcement around the rim of the crown where the stresses cannot radiate in all directions from a point of impact. A still further object of the invention, therefore, is to provide compact unobtrusive reinforcement around the helmet where the crown joins the skirt.

Additional objects of the invention relate to the problem of forming the skirt portion of the helmet with special reference to the production of a skirt of finished appearance with smooth, well-formed edges.

Broadly described, these various objects are accomplished by forming the crash helmet in two separate parts or members, one being the crown portion and the other the skirt portion, and bonding these two parts together in a unitary manner and in a manner to provide the desired stiffening or reinforcement around the rim of the crown portion. By making the helmet in two sections in this manner the interference with the withdrawal of forming elements by overhanging parts of the formed material is avoided completely, thus making possible the use of simple and rapid forming or molding techniques. The problem of providing a skirt portion of greater resilience or flexibility than the crown portion is solved by this procedure since the skirt may be processed independently of the crown and may be of entirely different material if desired, or of different wall thicknesses.

The various objects and features of the invention will be apparent in the detailed description to follow combined with the accompanying drawings.

In the drawings, which are to be regarded as merely illustrative,

Figure 1 is a front elevation of the finished helmet;

Figure 2 is a plan view of the finished helmet;

Figure 3 is a side elevation of the helmet;

Figure 4 is a front elevation of the bowl-like member from which the skirt section of the helmet is cut;

Figure 5 is a fragmentary section of the bowl-like member taken as indicated by the line 5—5 of Figure 4;

Figure 6 is a similar fragmentary section of the finished skirt section of the helmet taken as indicated by line 6—6 of Figure 1;

Figure 8:
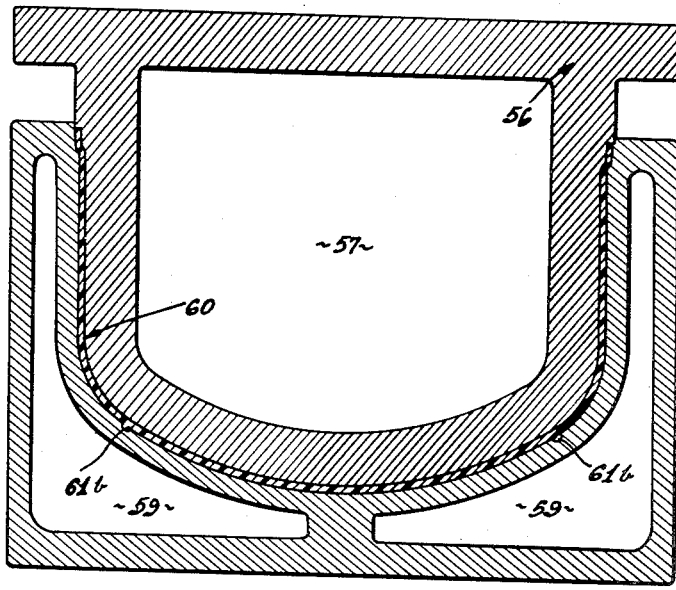
Figure 8 is a similar view of dies for forming the bowl-like member from which the skirt is cut.

While reinforced plastics are preferred for the fabrication of the crash helmet and various plastics may be employed in various practices of the invention, the helmet can typically be made of a suitable thermo-setting polyester resin, internally reinforced by glass or other fibers. Known polyester resins may be employed, with internal reinforcing by glass or other fibers, to produce thin-walled structures that are stronger than steel, weight for weight, with respect to tensile strength, compressive strength, and flexural strength. They are thus especially applicable for the fabrication of a crash helmet, especially for the crown. No detailed description of particular polyester resins suitable to the purpose is deemed necessary herein, because their nature and qualities are well known in the art, as are their processing techniques, including the incorporation therein of reinforcing fibers. Those skilled in the art will readily select appropriate resins depending upon the rigidity and flexibility desired in the crown and skirt portions, respectively, of the helmet. Various other thermo-setting resins, with glass fiber or other suitable fillers, as well as thermo-plastic materials, with or without fillers, may also be employed.

It is also possible to form the separate crown and skirt portions of the helmet by injection molding, using such a thermoplastic material, such as ethyl cellulose, butyrate acetate, and the like. While the invention will be hereinafter particularly described with reinforced thermo-setting plastics and corresponding forming dies particularly in view, it is also to be borne in mind, therefore, that the same crown and skirt may be injection molded, using known plastics suitable for injection molding, and injection molding dies whose construction will be obvious to those skilled in the art.

Referring now to the drawings, the crash helmet shown in Figures 1, 2 and 3, comprises a crown portion or section generally designated 20 and a skirt portion or section generally designated 21. Preferably the crown 20 is formed or embossed with a series of reinforcing ribs 22.

The skirt 21 of the helmet has a front band portion 25 to protect the wearer's forehead, two side portions in the form of curved ear protectors 26, and a rear band portion 27 that affords a measure of protection for the wearer's neck. As heretofore stated it is contemplated that whereas the crown should be relatively stiff, the skirt 21 may be relatively yielding and flexible, not only to permit flexure of the skirt and especially the ear protectors in donning and doffing the helmet, but also to avoid injury to the wearer that might result from rigid edges. Forming of the crown and skirt in two separate parts permits selection of different materials to give the desired qualities in each.

Figure 9:
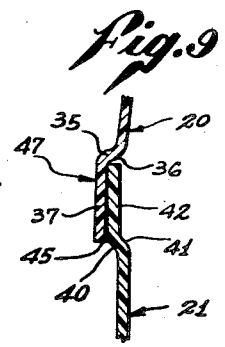
Figure 9 is a fragmentary section taken as indicated by the line 9—9 of Figure 3 showing how the helmet is reinforced or stiffened around the rim of the crown.

The preferred method of bonding together the crown 20 and the skirt 21 to produce a unitary structure may be understood by referring to Figure 9. As there shown, the crown portion 20 of the helmet is formed with a continuous outward offset evenly spaced from its edge to form an outer crown shoulder 35, a corresponding inner crown shoulder 36 and a crown rim or flange 37.

In similar manner, the skirt 21 has a continuous offset evenly spaced from its edge or rim to form an outer skirt shoulder 40, an inner skirt shoulder 41 and a skirt rim or flange 42.

It is contemplated that these two described rim structures of the crown 20 and the skirt 21 respectively will telescope together and, while either may telescope over the other, it is preferred that the rim structure of the crown telescope over the rim structure of the skirt, since this relationship produces a joint of good appearance in that it makes possible concealment or at least inconspicuous placement of the bonding material employed to unite the two sections of the helmet.

A feature of the described rim portions of the crown and skirt is that the rim flange of one abuts the inner shoulder of the other. Thus as may be seen in Figure 9, when the parts are suitably dimensioned for telescoping of the rim structure of the crown over the rim structure of the skirt, the rim flange 42 of the skirt abuts and nests against the inner shoulder 36 of the crown. The advantage of this aspect of the invention is that the crown and skirt are self-aligning when brought together.

In the presently preferred fabrication procedure, the crown and skirt 20 and 21 of the helmet having been cured through their final thermosetting stages are brought together in the manner indicated in Figure 9, the overlapping rim flanges 37 and 42 being bonded to one another, for instance, by use of any suitable bonding agent, as indicated at 45. The result is not only unitary bonding of the crown 20 to the skirt 21, but also strengthening reinforcement of the unitary structure by a suitably thick continuous rib 47. The strength of this rib is derived from both of the telescoped rim flanges 37 and 42 as well as from both offsets.

The crown 20 and the skirt 21 of the described crash helmet structure may be formed in any suitable manner known to the art and may be internally reinforced in any suitable manner. Thus the resin for both the crown 20 and the skirt 21 may incorporate glass or other fibers, or woven fabric of glass or other materials.

Figure 7:
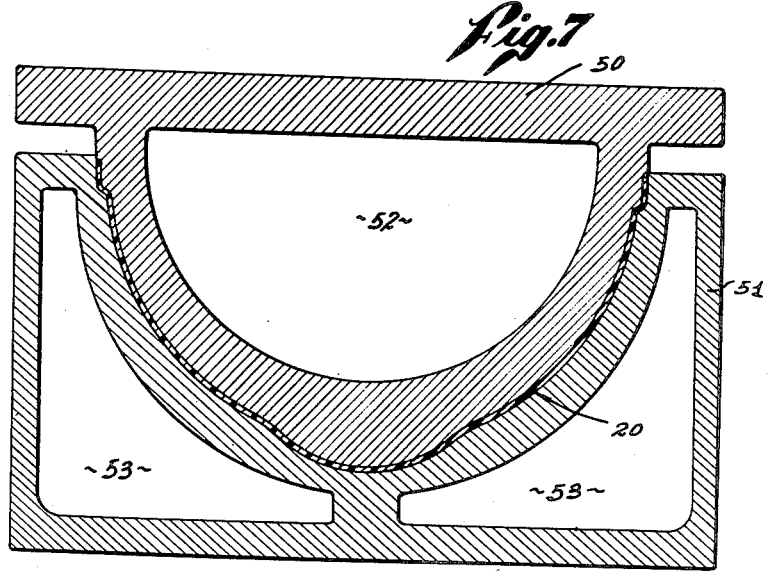
Figure 7 is a cross-sectional view more or less diagrammatic of dies for forming the crown section of the helmet.

Figures 7 and 8 indicate how conventional dies may be employed in the fabrication procedure.

The male die 50 and the complementary female die 51 in Figure 7 are adapted to mold a crown 20 in the manner shown. For internal heating to the desired final curved temperature, the upper die 50 may incorporate a steam chamber 52 and the lower die 51 may be likewise formed with a steam chamber 53. These two dies are, of course, suitably shaped to form the previously mentioned radial ribs 22 and the previously mentioned rim offset in the crown section 20. The flaring of the rim of the crown facilitates separation from the die as well as being desirable for reasons heretofore explained. It is usually necessary to trim the edges of the crown section after this molding procedure.

Figure 8 shows a similar male die 56 with a steam chamber 57 and a complementary female die 58 with a steam chamber 59 suitable for forming a thin-walled bowl-shaped member 60 that may be trimmed to the desired configuration of the skirt of the finished helmet. The formed bowl-shaped member 60, which is best shown in Figure 4, is preferably formed with offsets 61a (Figure 5) along the lower edges of what are to become the front and rear bands 25 and 27, and with ribs or beads 61b around the lower portions of what are to become the ear protectors 26. The central area of the bowl-shaped member 60 defined by these ribs, beads or offsets is then cut away to form the continuous lower edge of the skirt 21. The area to be cut away for this purpose is designated by the numeral 62 in Figure 4. By trimming just below the offsets 61a, the lower edges of bands 25 and 27 are formed with ribs or beads, as clearly shown in Figure 6. The cutting away of the area 62 of the bowl member may be carried out in any suitable manner, preferably by means of suitable cutting dies. Obviously, it is feasible, alternatively, to so form the die as to properly trim or form the skirt in such manner that the portion 62 is not formed, and the subsequent trimming step is thus eliminated.

Also, as already suggested, it is quite possible to form the crown and skirt members of the helmet of suitable materials in injection molding dies, the construction of which will be obvious, and need not be detailed herein.

My description in detail of a preferred practice and embodiment of the invention will suggest to those skilled in the art various changes and modifications that depart from my disclosure but nevertheless come within the scope and spirit of the appended claims.

Having described my invention, I claim:

1. A protective helmet of the character described, comprising: a crown member of plastic material with an offset around its rim forming an outwardly extending shoulder together with a rim flange; a matching skirt member of plastic material with a similar offset forming a similar shoulder together with a similar rim flange, said two rim flanges being telescoped together, said skirt including downwardly extending side portions to form curved ear protectors; and bonding material uniting said two rim flanges to form a unitary helmet strengthened around the rim of said crown member by the overlapping of said rim flanges.

2. A protective helmet as set forth in claim 1 in which the edge of the rim flange of one of said two members abuts the offset of the other member.

3. A protective helmet as set forth in claim 1 in which the rim flange of said crown member telescopes over the rim flange of said skirt member.

4. A protective helmet as set forth in claim 1 in which the exposed surface of said bonding material is substantially continuous with the surface of the offset of the skirt member.

References Cited in the file of this patent

UNITED STATES PATENTS

| Number | Name | Date |
|---|---|---|
| 780,782 | Curtis | Jan. 24, 1905 |
| 1,162,037 | Lomas | Nov. 30, 1915 |
| 1,594,174 | Hart | July 27, 1926 |
| 2,177,145 | Lewis | Oct. 24, 1939 |
| 2,297,874 | Clark | Oct. 6, 1942 |
| 2,421,633 | Lyon | June 3, 1947 |

FOREIGN PATENTS

| Number | Country | Date |
|---|---|---|
| 19,109 | Great Britain | 1914 |